Aug. 7, 1956
T. B. CLINE
2,757,410
KNIFE HEAD FOR SAUSAGE SKINNING MACHINE
Filed Feb. 18, 1954
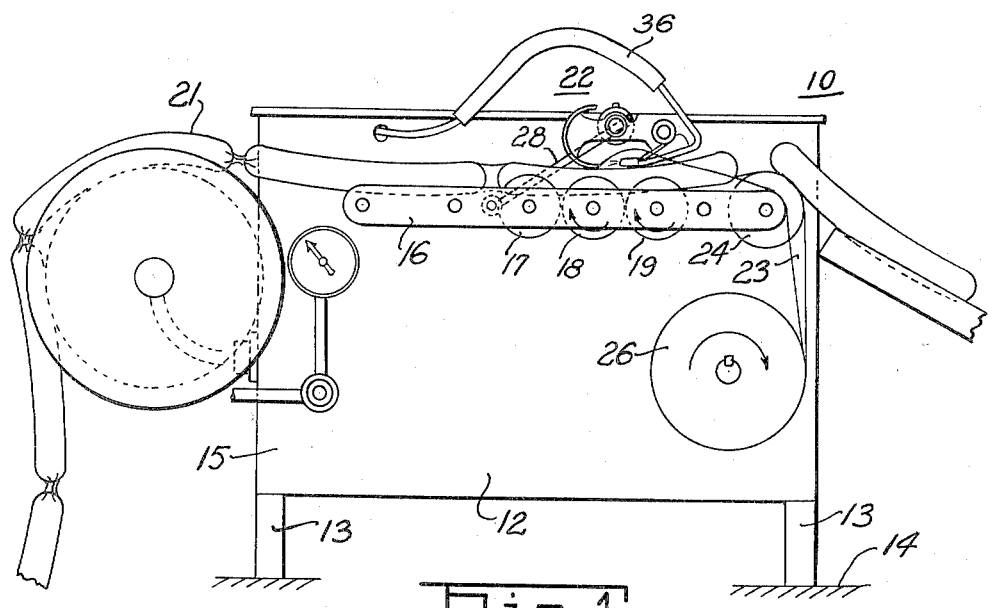
Fig.1.
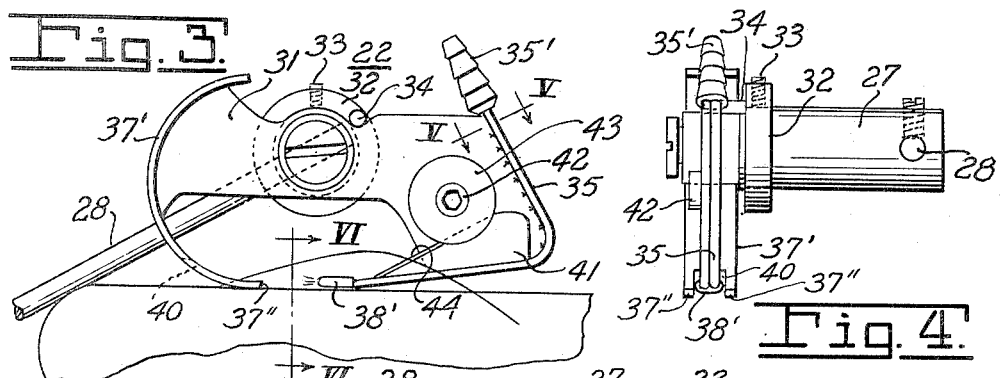
Fig.3.
Fig.4.
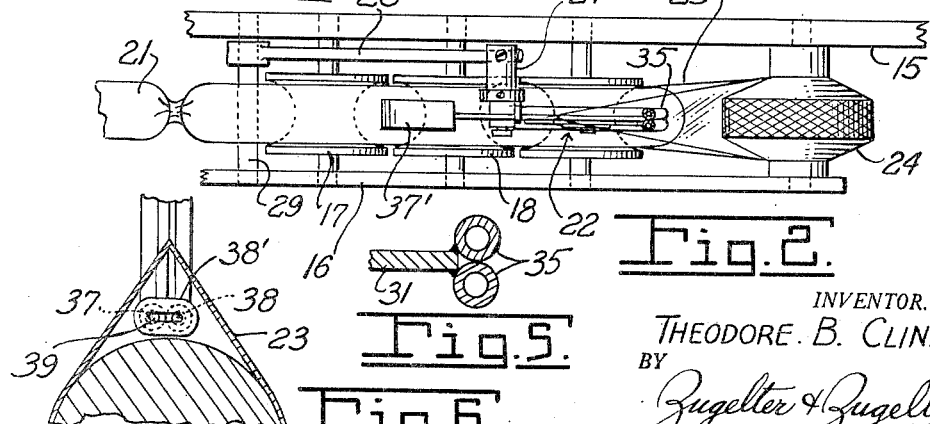
Fig.2.
Fig.5.
Fig.6.
INVENTOR.
THEODORE. B. CLINE
BY
Zugelter & Zugelter
Attys.

United States Patent Office 2,757,410
Patented Aug. 7, 1956

2,757,410

KNIFE HEAD FOR SAUSAGE SKINNING MACHINE

Theodore B. Cline, Sycamore Township, Hamilton County, Ohio

Application February 18, 1954, Serial No. 411,153

10 Claims. (Cl. 17—1)

This invention relates to a machine for skinning sausages. More particularly, this invention relates to a knife head assembly for a sausage skinning machine.

An object of this invention is to provide a knife head assembly for a skinning machine which separates the casing from the individual sausages of a string of sausages and raises the separated skin at a point in advance of the slitting knife, whereby the skin of a string of sausages may be continuously slit and removed.

A further object of this invention is to provide a rocking or pivotally mounted knife assembly having a skid adapted to ride on top of the sausages of a string of sausages at a point ahead of the knife.

A further object of this invention is to provide a head assembly adapted to pivot or swing to a suitable position for ready threading of the casing.

A further object of this invention is to provide a knife head assembly in which an air blast is projected into a casing by a pair of air nozzles.

A further object of this invention is to provide a knife head assembly for supporting a pair of air nozzles with a space between the nozzles in which an edge of a knife blade is mounted.

The above and other objects and features of the invention will in part be apparent and will in part be obvious to those skilled in the art to which it pertains, from the following detailed description and the drawing in which:

Figure 1 is a view in side elevation of a sausage skinning machine having a knife head assembly constructed in accordance with an embodiment of this invention;

Fig. 2 is a fragmentary plan view showing a portion of the machine illustrated in Fig. 1;

Fig. 3 is an enlarged view in side elevation of the knife head assembly;

Fig. 4 is a view in end elevation of the head assembly;

Fig. 5 is a view in section taken on the line V—V in Fig. 3; and

Fig. 6 is a view in section, taken on the line VI—VI in Fig. 3.

In the following detailed description, and the drawing, like reference characters indicate like parts.

As illustrated in Fig. 1, a sausage skinning machine is indicated generally at 10. The machine includes the box-like frame 12 and supporting legs 13. The machine may be placed on an appropriate support 14 (not shown in detail). The frame 12 includes a front or face plate 15 on which a roll-supporting frame 16 is supported. The frame 16 supports a series of rolls 17, 18 and 19. A string of sausages 21 passes over the rolls 17, 18 and 19, and is propelled by the rolls 18 and 19 which are driven by appropriate driving mechanism. As the string 21 is fed through the machine, it passes under a knife head assembly 22. The knife head assembly 22 slits the sausage casing 23 lengthwise. The slit casing passes over a roll 24 and accumulates on a power driven wind-up roll 26.

Details of construction of the knife head assembly 22 are shown in Figs. 3 and 4. The assembly includes an elongated plate-like body member 31. The member 31 is pivotally mounted on a shaft 27 substantially centrally of the member 31. The shaft 27 is mounted on a crank arm 28. One end of the crank arm 28 is pivotally mounted on a bolt 29, as most clearly shown in Fig. 2. The shaft 27 can be swung upwardly away from the rolls 18 and 19 when desired, to permit access to the rolls and during threading of a string of sausages over the rolls.

The member 31 is adapted to swing on shaft 27 through a limited arc. As shown in Fig. 4, a collar 32 is mounted on shaft 27 and is held in place thereon by a set screw 33. The collar 32 carries a stop pin 34. Stop pin 34 is adapted to engage the elongated body member 31 to limit swinging thereof in a counter-clockwise direction, as shown in Fig. 3.

The body member 31 carries a pair of air pipes 35 which are attached to the right hand end of the body member, as shown in Fig. 3. The upper ends of the air pipes 35 communicate with an air inlet fitting 35'. An air line 36 is attached to the fitting 35', as shown in Fig. 1. The air line 36 receives air under pressure from an appropriate source of air under pressure (not shown). The pipes 35 terminate, as shown in Fig. 6, in a pair of nozzles 37 and 38, which, as shown in Fig. 3, are directed lengthwise of and beneath the elongated member 31 substantially under the shaft 27. The air pipes are mounted on the right hand end of member 31, as shown in Fig. 3, and the nozzles are directed in a direction opposite to the direction of movement of the sausages. A skid member 37' is mounted on the left hand end of body member 31. The skid member 37' terminates in a lower portion below the elongated member and closely spaced from the nozzles 37 and 38. As shown in Fig. 3, the lower end of skid 37' is bifurcated to form two end portions 37" which ride on top of the sausage casing. The nozzles 37 and 38 are constructed to extend inside the casing of the string of sausages so that the air from the nozzles is projected into the casing, spreads the casing, and raises the casing from the sausages. As shown in Fig. 3, the tips of the nozzles carry a ferrule 38' which is rounded, as shown, so that the ferrule can ride on the sausages without being snagged thereby. The ferrule is provided with a narrow slot 39 through which air is projected. The air raises the casing from the sausages as shown, to permit the knife to slit the casing. The air is directed between the bifurcations 38' of the skid and through the space 40 therebetween.

As shown in Figs. 3 and 6, a knife blade 41 is mounted on the body member in the space between the nozzles 37 and 38. The knife blade is held in place on the body member 31 by means of a screw 42 and a washer 43. The lower front tip of the knife blade falls between the nozzles and the edge 44 of the knife blade slopes upwardly and rearwardly from the ferrule 38. As the sausages are drawn past the nozzles, the knife blade 41 slits the casing lengthwise thereof so that the casing can readily be withdrawn from the sausages.

During operation of the sausage-skinning machine, the skid 37' travels on top of the casing while the ferrule 38' may rest on the sausages or rest slightly above the sausages as indicated in Fig. 3. The stop 34 is positioned to prevent swinging of the nozzles and ferrule any greater distance above the sausages of the string, than shown, and limits swinging of the skid in a direction toward the sausages. However, when the knife head assembly is raised or released from the sausages, the body member 31 can be swung in a clockwise direction to expose a sufficient amount of space between the skid 37' and the nozzles 37 and 38 to permit ready threading of a casing between the skid and the nozzles. The stop pin 34 prevents swinging of the body member 31 in a counter-clockwise direction beyond the position shown in Fig. 3.

in which the nozzles and the lower end of the skid are at approximately equal heights.

The knife head assembly can rise and fall with variations in thickness of the sausages of the string as the crank arm 28 pivots on its support.

The knife head assembly illustrated in the drawing and described above is subject to structural modification without departing from the spirit and scope of the appended claims.

Having described my invention, what I claim as new, and desire to secure by Letters Patent is:

1. A machine for removing casings from sausages which comprises a frame having a conveyor over which the encased sausages travel, a knife head assembly, means for mounting the knife head assembly for up and down movement above the conveyor, said mounting means comprising a crank arm pivotally mounted on said frame, said knife head assembly comprising an upright plate pivotally mounted on the crank arm, a pair of pipes secured to said plate and extending below the plate to a point substantially under the pivot of the plate, said pipes terminating in nozzles at said point, a skid secured to said plate forwardly of the nozzles and extending under and along the same to a point adjacent the discharge ends of said pipes, said skid having laterally spaced apart bearing portions lying in substantially the same horizontal plane as that of the pipes, said skid having an opening therein formed between the bearing portions, whereby fluid from said pipes is discharged under the casings of sausages beyond said skid, said skid being disposed to slide on sausages to be skinned as the same travel under the plate, and a knife blade supported on said pipes at the discharge ends thereof.

2. A machine for removing casings from sausages which comprises a frame having a conveyor over which the encased sausages travel, a knife head assembly, means for mounting the knife head assembly for up and down movement above the conveyor, said mounting means comprising a crank arm pivotally mounted on said frame, said knife head assembly comprising an upright plate pivotally mounted on the crank arm, a pair of pipes secured to said plate and extending below the plate to a point substantially under the pivot of the plate, said pipes terminating in nozzles at said point, a skid secured to said plate forwardly of the nozzles and extending under and along the same to a point adjacent the discharge ends of said pipes, said skid having laterally spaced apart bearing portions lying in substantially the same horizontal plane as that of the pipes, said skid having an opening therein formed between the bearing portions, whereby fluid from said pipes is discharged under the casings of sausages beyond said skid, said skid being disposed to slide on sausages to be skinned as the same travel under the plate, a knife blade supported on said pipes at the discharge ends thereof, and means for limiting turning of the skid in a direction toward the sausages when the nozzles are substantially in horizontal alignment with the sausage-engaging portion of the skid.

3. A machine for removing casings from sausages which comprises a frame having a conveyor over which the encased sausages travel, a knife head assembly, means for mounting the knife head assembly for up and down movement above the conveyor, said mounting means comprising a crank arm pivotally mounted on said frame, said knife head assembly comprising an upright plate pivotally mounted on the crank arm, a pair of pipes secured to said plate and extending below the plate to a point substantially under the pivot of the plate, said pipes terminating in nozzles at said point, a skid secured to said plate forwardly of the nozzles and extending under and along the same to a point adjacent the discharge ends of said pipes, said skid having laterally spaced apart bearing portions lying in substantially the same horizontal plane as that of the pipes, said skid having an opening therein formed between the bearing portions, whereby fluid from said pipes is discharged under the casings of sausages beyond said skid, said skid being disposed to slide on sausages to be skinned as the same travel under the plate, a knife blade supported on said pipes at the discharge ends thereof, the knife blade being located in the space between the nozzle ends of the pipes and secured thereto, and a ferrule embracing the nozzle ends.

4. A knife head for a sausage-skinning machine which comprises an elongated body member having spaced ends, an airline attached to one end of said body member, said airline terminating in a pair of closely spaced nozzles projecting lengthwise of and below the body member, a skid attached to the other end of the body member and extending under the body member, the skid terminating adjacent and closely spaced from the tips of the nozzles, said skid having laterally spaced apart bearing portions lying in substantially the same horizontal plane as the nozzles, said skid having an opening therein formed between the bearing portions, whereby fluid from said nozzles is discharged under the casings of sausages beyond said skid, a knife blade attached to the body member, said knife blade having a tip adjacent and between the nozzles and an edge sloping upwardly and away from the skid, a transverse shaft, means for pivotally mounting the member on said shaft substantially centrally of the body member, a crank arm, means for attaching one end of said crank arm to the shaft, and means for pivotally mounting the other end of the crank arm on the machine, whereby the body member is adapted to ride up and down with the nozzles and skid as the nozzles and skid ride upon a string of sausages.

5. A knife head for a sausage skinning machine which comprises an elongated body member having spaced ends, an airline attached to one end of said body member, said airline terminating in a pair of closely spaced nozzles projecting lengthwise of and below the body member, a skid attached to the other end of the body member and extending under the body member, the skid terminating adjacent and closely spaced from the tips of the nozzles, said skid having laterally spaced apart bearing portions lying in substantially the same horizontal plane as the nozzles, said skid having an opening therein formed between the bearing portions, whereby fluid from said nozzles is discharged under the casings of sausages beyond said skid, a knife blade attached to the body member, said knife blade having a tip adjacent and between the nozzles and an edge sloping upwardly and away from the skid, a transverse shaft, means for pivotally mounting the member on said shaft substantially centrally of the body member, a stop limiting swinging of the nozzles in the direction of sausage advance, the stop halting swinging when the nozzles and the tip of the skid are at substantially equal heights, the body member being adapted to swing in the opposite direction when released, a crank arm, means for attaching one end of said crank arm to the shaft, and means for pivotally mounting the other end of the crank arm on the machine, whereby the body member is adapted to ride up and down with the nozzles and skid as the nozzles and skid ride upon a string of sausages.

6. A machine for removing casings from sausages which comprises a frame, a conveyor mounted on said frame, means for drawing a string of sausages along the conveyor, a knife head assembly, means for mounting the knife head assembly for rotational movement toward and away from the conveyor, said mounting means comprising a crank arm pivotally mounted on said frame, said knife head assembly comprising an upright plate pivotally mounted on the crank arm, a pipe secured to said plate and extending below and substantially in alignment with said plate to a point substantially under the pivot of the plate, said pipe terminating in a nozzle, a skid secured to said plate and extending under and along the same to a point adjacent the discharge end of the pipe, said skid having laterally spaced apart bearing portions lying in substantially the same horizontal plane as the pipe, said skid having an opening therein formed between the bearing portions, whereby fluid from said pipe is discharged under the casings of sausages beyond said skid, the sausages sliding under said skid as the same travel under the plate, and a knife blade supported on said pipe at the discharge end thereof for slitting the casing.

7. In combination with an air blast plow and cutter member for removing casings from a line of link sausages, said plow having a leading terminal portion, a skid positioned in advance of the said terminal portion and having laterally spaced apart bearing portions lying in substantially the same horizontal plane as that of said plow, said skid having an opening formed therein between said bearing portions in substantially the same vertical plane of the terminal portion of the plow whereby air from said plow and cutter member may pass along a row of sausages beyond said skid from between the said bearing portions.

8. In combination with an air blast plow and cutter member for removing casings from a line of link sausages, said plow having a leading terminal portion, a follower positioned closely in advance of the said terminal portion of the plow and having two laterally spaced apart and arcuately shaped foot members projecting rearwardly and forming bearing portions upon the casing, said bearing portions straddling the terminal portion of the plow and lying in substantially the same horizontal plane as said terminal portion, said plow having an opening formed between the bearing portions of the foot members in substantially the same vertical plane as that of the terminal portion of the plow whereby air from said plow and cutter member may pass along a row of sausages beyond said follower from between the said bearing portions.

9. In combination with an air blast plow and cutter member for removing casings from a line of link sausages, said plow having a leading terminal portion, a skid positioned closely in advance of the said terminal portion and having laterally spaced apart bearing portions lying on opposite sides of and in substantially the same horizontal plane as that of said plow, said skid having an opening formed therein between said bearing portions in substantially the same vertical plane as the terminal portion of the plow, whereby air from said plow and cutter member may pass along a row of sausages beyond said skid from between the said bearing portions.

10. In combination with an air blast plow and cutter member for removing casings from a line of link sausages, said plow having a leading terminal portion, a follower positioned closely in advance of the said terminal portion of the plow and having two laterally spaced apart depending and rearwardly projecting bearing portions lying on opposite sides of and in substantially the same horizontal plane as that of said plow, said follower having a slot formed between said bearing portions in substantially the same vertical plane as that of the terminal portion of the plow whereby air from said plow and cutter member may pass along a row of sausages beyond said follower from between the said bearing portions.

References Cited in the file of this patent

UNITED STATES PATENTS

| | | |
|---|---|---|
| 2,340,755 | Jacobson | Feb. 1, 1944 |
| 2,424,346 | Wilcoxon | July 22, 1947 |
| 2,630,598 | Grey | Mar. 10, 1953 |
| 2,686,927 | Grey | Aug. 24, 1954 |